United States Patent
Klimuk et al.

(10) Patent No.: US 12,423,721 B2
(45) Date of Patent: *Sep. 23, 2025

(54) MACHINE-LEARNED DATABASE INTERACTION MODEL

(71) Applicant: ZenPayroll, Inc., San Francisco, CA (US)

(72) Inventors: Kirill Klimuk, San Mateo, CA (US); Roman E. Zubenko, San Francisco, CA (US); Sara A. Berry, San Francisco, CA (US)

(73) Assignee: ZenPayroll, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,330

(22) Filed: Apr. 20, 2024

(65) Prior Publication Data

US 2024/0273560 A1    Aug. 15, 2024

Related U.S. Application Data

(63) Continuation of application No. 17/315,988, filed on May 10, 2021, now Pat. No. 11,995,668.

(51) Int. Cl.
*G06Q 30/0202* (2023.01)
*G06F 16/28* (2019.01)
(Continued)

(52) U.S. Cl.
CPC ....... *G06Q 30/0202* (2013.01); *G06F 16/288* (2019.01); *G06N 5/04* (2013.01); *G06N 20/00* (2019.01)

(58) Field of Classification Search
CPC .... G06Q 30/0202; G06F 16/288; G06N 5/04; G06N 20/00
See application file for complete search history.

(56) References Cited

U.S. PATENT DOCUMENTS 10,740,690 B2 * 8/2020 Pasternack ............. G06N 20/00
10,789,610 B2    9/2020 Smith
(Continued)

FOREIGN PATENT DOCUMENTS

WO    WO 2018/013985 A1    1/2018

OTHER PUBLICATIONS

Amatriain, X. "Mining large streams of user data for personalized recommendations," *ACM SIGKDD Explorations Newsletter*, vol. 14, No. 2, Apr. 30, 2013, pp. 37-48.
(Continued)

*Primary Examiner* — Dylan C White
(74) *Attorney, Agent, or Firm* — Fenwick & West LLP

(57) ABSTRACT

A central database system trains a machine-learned model based on training data identifying entity characteristics of account holder entities, content item characteristics of a content item presented to the account holder entities, and interactions between the account holder entities and the presented content item. The central database system then identifies a target set of account holder entities, and applies the trained machine-learned model to the entity characteristics of each account holder entity of the target set of account holder entities, the entity characteristics of each of the account holder entities that previously interacted with the content item, and the content item characteristics of the content item to identify a subset of the target set of account holder entities for presentation of the content item. The content item is then displayed to the subset, the content item includes an interface element that, when selected, causes an interaction to take place.

20 Claims, 5 Drawing Sheets

(51) Int. Cl.
*G06N 5/04* (2023.01)
*G06N 20/00* (2019.01)

(56) References Cited

U.S. PATENT DOCUMENTS

| | | | |
|---|---|---|---|
| 11,244,340 | B1 | 2/2022 | Morin et al. |
| 11,288,333 | B2 | 3/2022 | Ushanov et al. |
| 11,321,741 | B2* | 5/2022 | Xu ................... G06N 20/00 |
| 11,561,671 | B2 | 1/2023 | Smith |
| 2013/0097153 | A1 | 4/2013 | Barbieri et al. |
| 2018/0121392 | A1* | 5/2018 | Zhang ................ G06F 40/169 |
| 2018/0211270 | A1 | 7/2018 | Wu et al. |
| 2018/0276561 | A1* | 9/2018 | Pasternack ........... G06F 16/353 |
| 2019/0182059 | A1 | 6/2019 | Abdou et al. |
| 2019/0342616 | A1* | 11/2019 | Domm ................. G06Q 50/01 |
| 2020/0090247 | A1* | 3/2020 | Sokolov ............ G06Q 30/0264 |
| 2020/0327604 | A1 | 10/2020 | Morin et al. |
| 2021/0406838 | A1 | 12/2021 | Ramanath et al. |
| 2023/0092079 | A1 | 3/2023 | Kaza et al. |
| 2023/0334524 | A1* | 10/2023 | Sahyoun ........... G06Q 30/0246 |
| 2024/0337815 | A1* | 10/2024 | Lin .................... G02B 13/0045 |

OTHER PUBLICATIONS

Canadian Intellectual Property Office, Office Action, Canadian Patent Application No. 3,156,999, Feb. 28, 2024, 3 pages.
United States Office Action, U.S. Appl. No. 17/315,988, filed Sep. 20, 2023, 15 pages.
United States Office Action, U.S. Appl. No. 17/315,988, filed Mar. 2, 2023, 14 pages.

* cited by examiner

400

Access a training set of information describing entity characteristics of each account holder entity of a first set of account holder entities, content item characteristics of a content item presented to each account holder entity of the first set, and interactions between the first set of account holder entities and the presented content item
410

Train a machine-learned model using the accessed training set of information
420

Identify a target set of account holder entities
430

Apply the trained machine-learned model to the entity characteristics of each account holder entity of the target set of account holder entities, the entity characteristics of each account holder entity of the first set of account holder entities that previously interacted with the content item, and the content item characteristics to identify a subset of the target set of account holder entities for presentation of the content item
440

Cause display of the content item to the subset within an interface displayed by a device
450

FIG. 4

MACHINE-LEARNED DATABASE INTERACTION MODEL

CROSS REFERENCE TO RELATED APPLICATIONS

This application is a continuation of U.S. application Ser. No. 17/315,988, filed May 10, 2021, now U.S. Pat. No. 11,995,668, which is incorporated by reference in its entirety.

TECHNICAL FIELD

This disclosure relates generally to database systems, and more specifically to training and applying machine-learned models in a database system.

BACKGROUND

Centralized database systems, such as employment management database systems, store large amount of data for the various entities associated with the database systems. In some embodiments, this data includes interactions between the entities associated with the database system and content items presented within the database system. Accordingly, centralized database systems may be able to identify patterns and characteristics of the entities, and thus may be positioned to offer valuable insight into which content items when presented to one or more entities are likely to result in an interaction.

SUMMARY

A central database system trains a machine-learned model based on training data identifying entity characteristics of account holder entities, content item characteristics of a content item presented to the account holder entities, and interactions between the account holder entities and the presented content item. The central database system then identifies a target set of account holder entities, and applies the trained machine-learned model to the entity characteristics of each account holder entity of the target set, the entity characteristics of each of the account holder entities that previously interacted with the content item, and the content item characteristics of the content item to identify a subset of the target set of account holder entities for presentation of the content item. The content item is then displayed to the subset, the content item including an interface element that, when selected, causes an interaction to take place. The account holder entities of the subset are associated with an above-threshold likelihood to result, when presented the content item, in an interaction with the content item.

BRIEF DESCRIPTION OF THE DRAWINGS

FIG. 4 is a flowchart illustrating a process for training and applying a machine-learned model to identify account holder entities to present with a content item, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
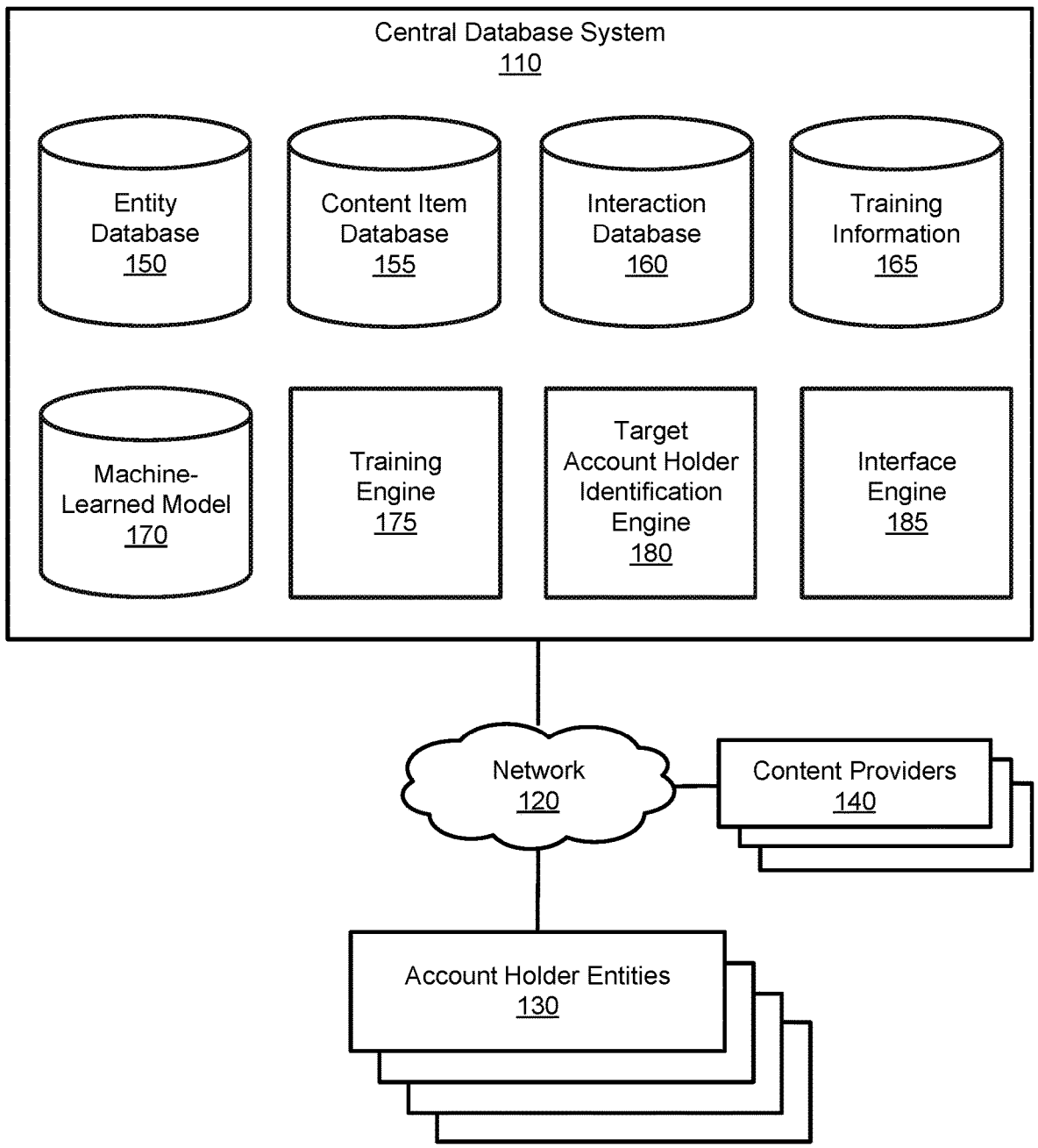
FIG. 1 is a block diagram of a system environment in which a central database system operates, according to one embodiment.

FIG. 1 is a block diagram of a system environment 100 in which a central database system 110 operates, in accordance with an embodiment. The system environment 100 shown by FIG. 1 includes the central database system 110, a network 120, one or more account holder entities 130, and one or more content providers 140. The system environment 100 may have alternative configurations than shown in FIG. 1, including for example different, fewer, or additional components.

The account holder entities 130 and the content providers 140 communicate with the central database system 110 via one or more computing devices capable of receiving user input as well as transmitting and/or receiving data via the network 120. Examples of computing devices include conventional computer systems (such as a desktop or a laptop computer, a server, a cloud computing device, and the like), client devices (such as smartphones, tablet computers, mobile devices, and the like), or any other device having computer functionality. The devices of the account holder entities 130 and the content providers 140 are configured to communicate with the central database system 110 via the network 120, for example using a native application executed by the devices or through an application programming interface (API) running on a native operating system of the devices, such as IOS® or ANDROID™ In another example, the devices of the account holder entities 130 and the content providers 140 are configured to communicate with the central database system 110 via an API running on the central database system.

It should be noted that when reference is made to an account holder entity 130 or a content provider 140 performing an action within the environment 100 of FIG. 1, in practice it may be a device of the account holder entity or the content provider, respectively, that is performing the action, for instance at the direction of the account holder entity or the content provider.

Account holder entities 130 can include any entities associated with accounts of the central database system 110. For instance, an account holder entity 130 may be an individual, an employee, an employer, a representative of a company or organization, and the like. As one example, an employer of 100 employees may be associated with an employer account within the central database system 110, and may provide employee information (such as name, title, biographic information, geographic information, salary, benefits, and the like) for each employee to the central database system 110. The central database system 110, in turn, may provision an account through the central database system 110 for each employee, and thus each employee may also be an account holder entity 130.

The content providers 140 provide content items and/or other information to the central database system 110 via the network 120. A content provider 140 may be an advisor, a lawyer or law firm, an accountant or accounting firm, a component or materials supplier, a venture capital firm or banking organization, a technology partner (such as an integration or IT provider), or any other suitable service or product provider. In some embodiments, the content providers 140 are associated with an account of the central database system 110. Content items provided by the content providers 140 to the central database system 110 may include graphical widgets, reminders, files, text, images, video, workflow content, recommendations (e.g., for finding business partners, for learning more about features of central database system 110, etc.), compliance requirements, payroll content, coupons, discount opportunities, tax credit opportunities, advertisements, any other suitable content, or any combination thereof. Each content item includes an interface element such as a link and/or a button providing a means for interacting with the content item. Other information provided by the content providers 140 to the central database system 110 may include content item characteristics. In some embodiments, the content items provided by the content providers 140 are sponsored content items for which the content providers 140 provide remuneration to the central database system 110 for distributing the content items.

The central database system 110, the account holder entities 130, and the content providers 140 are configured to communicate via the network 120, which may comprise any combination of local area and/or wide area networks, using wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The central database system 110 is configured to receive and store various information associated with one or more entities, such as the account holder entities 130 and the content providers 140. As described below, the central database system 110 is able to train and apply a machine-learned model to identify one or more account holder entities 130 that, if presented with a content item are most likely to interact with the content item. The central database system 110 is able to leverage information stored by the central database system 110 associated with the account holder entities 130 and the content item in order to train the machine-learned model.

In the embodiment of FIG. 1, the central database system 110 includes an entity database 150, a content item database 155, an interaction database 160, a training information database 165, a machine-learned model 170, a training engine 175, a target account holder identification engine 180, and an interface engine 185. It should be noted that in other embodiments, the central database system 110 can include fewer, additional, or different components that those illustrated herein. In addition, in the embodiment of FIG. 1, the central database system 110 is associated with an entity (such as a company or organization) different from the account holder entities 130 and the content providers 140. Accordingly, the central database system 110 includes hardware (such as servers, networking equipment, databases or other storage devices, data center systems, and the like) distinct (and in some embodiments, physically remotely from) the devices associated with the account holder entities 130 and the content providers 140.

The entity database 150 is configured to store entity characteristics associated with the account holder entities 130. In some embodiments, the entity characteristics stored in the entity database 150 is information gathered from the account holder entities 130 as these entities are establishing accounts with the central database system 110. For instance, the central database system 110 can be an enterprise software provider that provides human resources software to employers for use with employees. In this example, the employer may provide entity characteristics describing characteristics of the employer and describing characteristics of each of the employees to the central database system 110 during the course of provisioning accounts for the employees with the central database system 110. In other embodiments, entity characteristics associated with the account holder entities 130 can be provided to the central database system 110 for storage in the entity database 150 via any other suitable source or medium.

Examples of entity characteristics associated with an account holder entity 130 stored by the entity database 150 can include but are not limited to: a type of the account holder entity (e.g., a company, an educational institution, a professional or charitable association, an employer, an employee, a government organization, and the like), an age of the account holder entity (e.g., how long the entity has been in business, been established, etc.), a number of individuals or headcount associated with the account holder entity, tax or finance issue expertise of the account holder entity, compliance expertise of the account holder entity, an industry expertise of the account holder entity, fundraising or selling expertise of the account holder entity, non-profit expertise and capabilities of the account holder entity (e.g., grant expertise, R&D expertise, and the like), services offered by the account holder entity, a service type associated with the account holder entity (e.g., an automated service, personal/hand-holding service, and the like), an industry or focus associated with the account holder entity, a tax status of the account holder entity (e.g., for-profit business, non-profit organization, etc.), software used by the account holder entity, revenue or profits of the account holder entity, a filing city or state associated with the account holder entity (e.g., where the account holder entity files taxes), a state of incorporation or registration of the account holder entity, cities or states in which the account holder entity is present (e.g., does business, has offices, etc.), cities or states in which the account holder entity has employees or members, addresses associated with the account holder entity (e.g., addresses of offices of the account holder entity), geographic locations of customers of the account holder entity, or any other suitable characteristic of the account holder entity.

The content item database 155 is configured to store content item characteristics associated with content items and other information provided by the content providers 140. In some embodiments, the content item characteristics stored in the content item database 155 is information provided by the content providers 140 as the providers are establishing accounts with the central database system 110.

In other embodiments, content item characteristics associated with content items can be provided to the central database system 110 for storage in the content item database 155 via any other suitable source or medium.

Examples of content item characteristics associated with a content item and stored by the content item database 155 can include but are not limited to: one or more industries targeted by the content item, one or more demographics targeted by the content item, one or more expertise targeted by the content item, one or more geographic locations targeted by the content item, services described in the content item, products described in the content item, any time sensitive information included in the content item, amount of times the content item has been displayed and to whom, or any other suitable characteristic of the content item.

The interaction database 160 is configured to store interaction data associated with content items and the account holder entities that interact with the content items. In some embodiments, the interaction database 160 is updated with new interaction data every time an interaction between account holder entity 130 and content item takes place. Examples of interaction data stored by the interaction database 160 include who (i.e., which account holder entities) interacted with a content item, what type of interaction took place (e.g., selection of a link, selection of a button, etc.), what was the outcome of the interaction (e.g., positive outcomes such as likes, subscriptions, views, purchases, etc. or negative outcomes such as dislikes, deletions, dismisses, etc.), when an interaction with a content item takes place, an amount of time between a content item being displayed to an account holder entity and an interaction with the content item taking place, or any other suitable interaction data.

The training information database 165 includes a set of training information used to train a machine-learned model. In some embodiments, the set of training information includes historical information stored by the entity database 150 associated with a set of account holder entities 130, historical information stored by the content item database 155 associated with a content item, and historical information representative of interactions between the set of account holder entities and the content item stored by the interaction database 160. For instance, the set of training information can include multiple entries, with each entry including information describing entity characteristics of an account holder entity 130, information describing content item characteristics of a content item presented to the account holder entity 130, and information describing an interaction between the account holder entity 130 and the content item.

The machine-learned model 170 is a model that is trained by the training engine 175 using the set of training information stored in the training information database 165. The training engine 175 can train the machine-learned model 170 initially based on the set of training information, and can retrain the machine-learned model when the set of training information is updated (e.g., new information is added, one or more entity characteristics of an account holder entity 130 has changed, one or more content item characteristics of a content item has changed, interaction data has changed, and the like). The machine-learned model 170 can be retrained by the training engine 175 periodically, after the passage of a threshold amount of time, after the occurrence of a triggering event, at the request of a user or other entity associated with the central database system 110, and the like.

The training engine 175 can implement one or more machine learning techniques to train the machine-learned model 170. For instance, the machine-learned model can include one or more models, including but not limited to a linear support vector machine (linear SVM), boosting for other algorithms (e.g., AdaBoost), neural networks, logistic regression, naïve Bayes classifiers, memory-based learning techniques, random forest classifiers, bagged trees, decision trees, boosted trees, boosted stumps, a supervised or unsupervised learning algorithm, or any suitable combination thereof.

The machine-learned model 170 is trained based on the set of training information in order to identify one or more account holder entities 130 that, if presented with a content item, are most likely to interact with the content item. In some embodiments, the machine-learned model 170 is trained on the set of training information in order to identify one or more account holder entities 130 that, if presented with the content item, are most likely to have a positive interaction (e.g., a like, a subscribe, a click, a purchase, and so on) with the content item. In some embodiments, the machine-learned model 170 is trained to identify patterns or correlations between entity characteristics of a first set of account holder entities 130 presented with the content item, content item characteristics of the content item presented to the first set of account holder entities 130, and interactions between the first set account holder entities 130 and the content item. In some embodiments, some or all of the account holder entities 130 in the first set of account holder entities 130 are randomly presented with the content item. Based on the identified patterns and correlations, the machine-learned model can identify, based on entity characteristics of each account holder in a target set of account holder entities 130, entity characteristics of each of the account holder entities 130 of the first set that interacted with the content item, and the content item characteristics to identify a subset of the target set of account holder entities 130 for presenting the content item.

Figure 2:
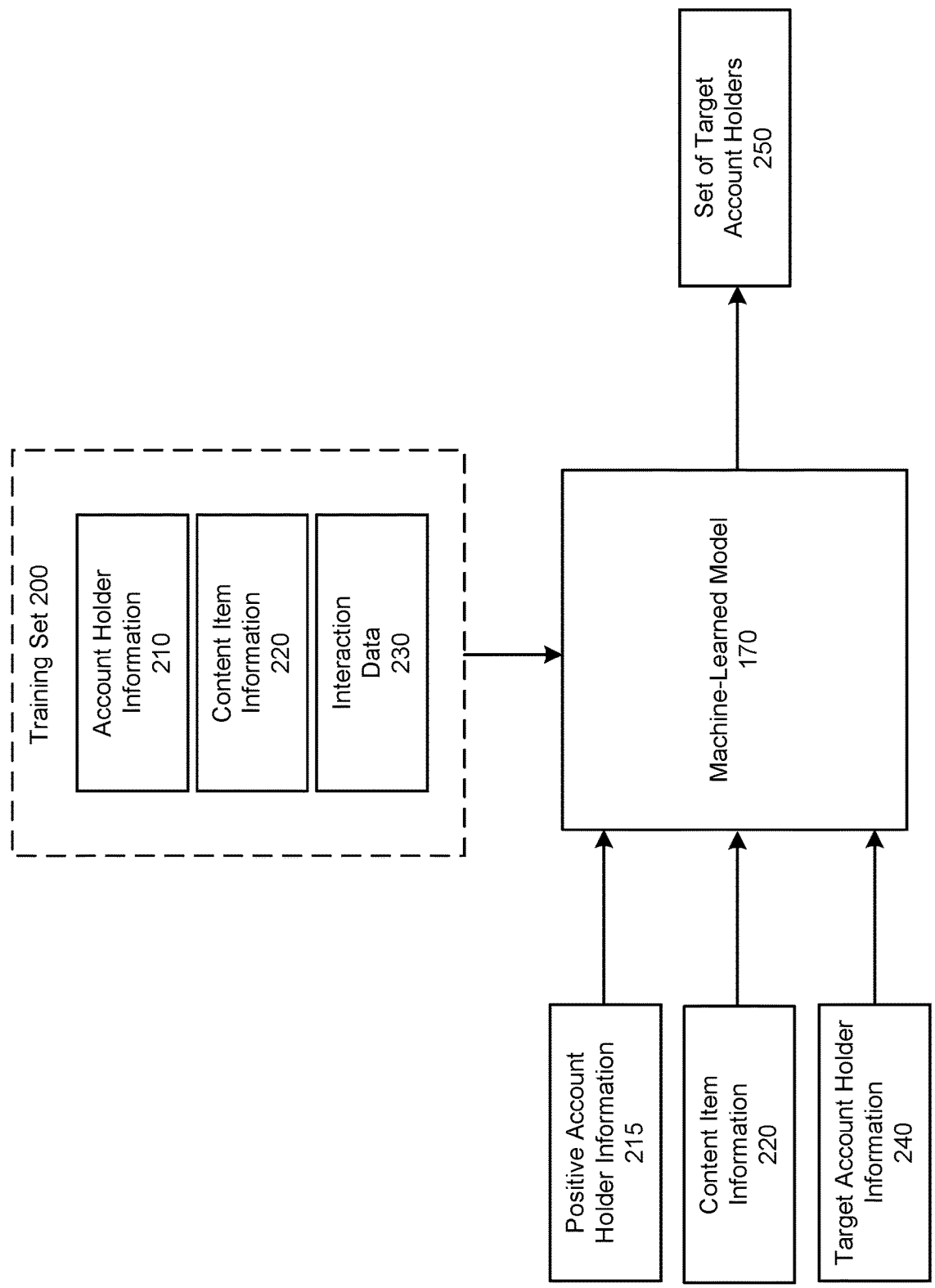
FIG. 2 is a data flow diagram illustrating the training and application of a machine-learned model, according to one embodiment.

FIG. 2 is a data flow diagram illustrating the training and application of a machine-learned model 170, according to one embodiment. In the embodiment of FIG. 2, the machine-learned model 170 is trained using a training set of information 200, including account holder information 210 (e.g., entity characteristics of a first set of account holder entities 130), content item information 220 (e.g., content item characteristics for a content item), and interaction data 230 (e.g., information describing interactions between the one or more account holder entities 130 of the first set and the content item). The machine-learned model 170 receives positive account holder information 215 (e.g., entity characteristics of one or more account holder entities 130 of the first set that interacted with the content item), content item information 220, and target account holder information 240 (e.g., entity characteristic of a target set of account holder entities 130), and identifies a set of target account holders 250 (e.g., a subset of the target set of account holder entities 130) that, when presented with the content item, are most likely to interact with the content item.

The target account holder identification engine 180 identifies a target set of account holder entities 130 to which a content item may be presented. The target set of account holder entities 130 are selected from the account holder entities 130 associated with accounts of the central database system 110. The target account holder identification engine 180 identifies a set of entity characteristics associated with each account holder entity 130. Examples of the identified set of entity characteristics include a size of the account holder entity 130, an industry of the account holder entity, a filing state of the account holder entity, or any other suitable entity characteristics (such as any of the entity characteristics described above with regards to the account holder entities 130 and stored within the entity database 150). The target account holder identification engine 180 identifies a set of content item characteristics associated with the content item. Example characteristics in the identified set of content item characteristics include one or more industries targeted by the content item, services described in the content item, any time sensitive information included in the content item, amount of times the content item has been displayed and to whom, or any other suitable characteristics (such as any of the content item characteristics described above with regards to the content item and stored within the content item database 155).

In some embodiments, the target account holder identification engine 180 can identify one or more account holder entities 130 of the target set based on entity characteristics of these account holder entities 130 matching some of the content item characteristics (e.g., when an account holder entity 130 grows to a certain headcount, the account holder entity 130 can be identified so that a content item advertising a law firm may be presented), based on a time or date (e.g., an account holder entity 130 can be selected so that a content item reminding the entity about payday may be presented within one day of payday), based on previous interactions with a content item by similar account holder entities 130 (e.g., if several companies in a particular industry within a particular geographic area interacted with a content item providing a discount on shipping expenses, a different account holder 130 within the particular industry and particular geographic area may be identified to be presented with the same content item), or based on any other suitable criteria.

In some embodiments, the target account holder identification engine 180 can identify one or more account holder entities 130 of the target set based on information from the content provider 140. For instance, the content provider 140 for a particular content item may dictate certain entity characteristics that have to be present in the one or more account holder entities 130. For example, the content provider for a particular content item that includes reminders for possible tax credits may dictate that the target set of account holder entities 130 should at least include account holder entities 130 that include one or more physical locations in California and are non-profit organizations.

In some embodiments, none of the account holder entities in the target set of account holder entities 130 satisfy exclusion criteria. Exclusion criteria are criteria that if satisfied results in an account holder entity 130 being excluded from the target set of account holder entities 130. In some embodiments, exclusion criteria may include an overlap between an entity characteristic of an account holder entity 130 and a content characteristic of the content item. In one example, an account holder entity 130 that provides tax services to customers (i.e., an entity characteristic) would not be identified to be presented with a content item that recommends tax preparation services (i.e., a content item characteristic). In some embodiments, exclusion criteria may include an opt-out setting set by the account holder entity 130. For example, an account holder entity 130 may select to opt-out of being presented with content items by the central database system 100 or may select to opt-out of being presented with content items based on content item characteristics. In some embodiments, exclusion criteria may include the account holder entity 130 having been presented the content item recently within a predefined time interval (e.g., within 1 hour, within 4 hours, within 1 day, etc.)

In some embodiments, the target account holder identification engine 180 may randomly select one or more account holder entities 130 to be part of the target set.

The target account holder identification engine 180 applies the machine-learned model 170 to the entity characteristics of each account holder entity 130 of the target set, the entity characteristics of each account holder entity 130 of the set of account holder entities 130 that previously interacted with the content item, and the content item characteristics associated with the content item. The machine-learned model 170 outputs a subset of the target set of account holder entities 130 to present the content item. As described above, the subset of the target set of account holder entities 130 are the account holder entities 130 that, when presented with the content item, are most likely to interact with the content item.

The subset of the target set of account holder entities 130 output by the machine-learned model 170 may include all account holder entities 130 within the target set of account holder entities 130 that are associated with an above-threshold likelihood to result, when presented the content item, in an interaction with the content item.

In some embodiments, the machine-learned model 170 is configured to recommend account holder entities 130 in the subset that are associated with entity characteristics that match a threshold amount (e.g., two matches, three matches, five matches, etc.) and/or a threshold percentage (e.g., 25%, 50%, 75%, etc.) of entity characteristics associated with the set of account holder entities 130 that previously interacted with the content item. For instance, an account holder entity 130 that previously interacted with the content item is associated with entity characteristics that include a headcount of 100 employees, 20 employees have selling expertise, and has a location in California. The machine-learned model 170 may determine an account holder entity 130 in the target set that is associated with entity characteristics that include a headcount of 85 employees, 20 employees have selling expertise, and has a location in California is included in the subset.

In some embodiments, the machine-learned model 170 ranks the account holder entities 130 in the subset of the target set of account holder entities 130. For example, a first account holder entity 130 in the subset may be ranked higher than a second account holder entity 130 in the subset based on the first account holder entity 130 having more entity characteristics in common with the set of account holder entities 130 that previously interacted with the content item than the second account holder entity 130.

In some embodiments, the machine-learned model 170 is configured to apply a weight to each account holder entity 130 in the set of account holder entities 130 that previously interacted with that content item. The weight may determine to what effect the entity characteristics of each account holder entity 130 in the set have on the determination of the subset of the target set of account holder entities 130. For example, an account holder entity 130 in the set that previously interacted with the content item may historically interact with substantially all of the content items it is presented with. This account holder entity 130 may be assigned a lower weight such that the entity characteristics of this account holder entity 130 are not considered by or are considered by a lesser degree by the machine-learned model 170 in the selection of the subset. In another example, an account holder entity 130 in the set that previously interacted with the content item and the interaction was a positive outcome (e.g., the account holder entity 130 selected a like button of the content item) may be assigned a higher weight such that the entity characteristics of this account holder entity 130 are considered to a higher degree by the machine-learned model 170.

The interface engine 185 coordinates communications between the entities of FIG. 1. For instance, the interface engine 185 receives information describing entity characteristics of the account holder entities 130 (for instance, while onboarding and provisioning accounts within the central database system 110 for these entities) and stores the received information in the entity database 150. Likewise, the interface engine 185 receives information describing content item characteristics of content items from the content providers 140 (for instance, while onboarding and provisioning accounts within the central database system 110 for the content providers) and stores the received information in the content item database 155. The interface engine 185 may receive information describing interactions with content items and store the received information in the interaction database 160. The interface engine 185 can provide one or more content items to the account holder entities 130. In some embodiments, the interface engine 185 generates and causes display of one or more graphic user interfaces (GUIs), for instance for display by a device of an account holder entity 130 and/or a device of a content provider 140.

Upon identifying a subset of the target set of account holder entities 130 to present the content item to, the interface engine 185 causes display of the content item within an interface displayed by a device associated with the account holder entities 130 of the subset. In some embodiments, the interface displayed by the device associated with the account holder entities 130 includes a GUI displayed by an application executed by the device and associated with the central database system 110. In some embodiments, the interface includes one or more interface elements (for instance, a link) that, when interacted with, causes a new content item to be presented or a new window to open. In some embodiments, the interface includes one or more interface elements that, when interacted with, causes a dismissal of the corresponding content item (i.e., a removal of the content item from the display). In some embodiments, instead of a content item displayed within an interface of an application associated with the central database system 110, the content item can be emailed, texted, or otherwise communicated to the account holder entities 130 for display within a different interface by a device associated with the account holder entities 130.

User Interface Examples

Figure 3A:
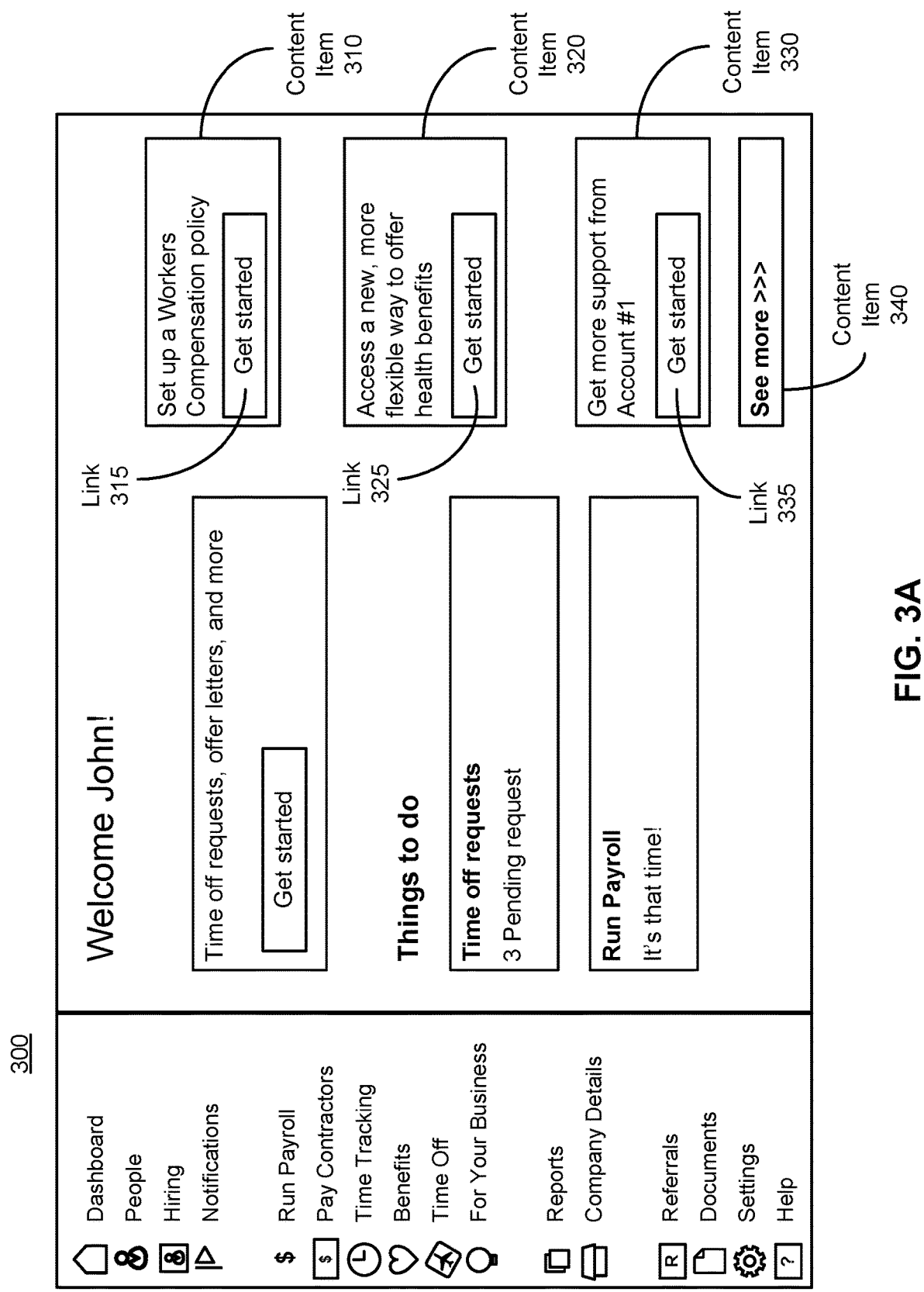
FIG. 3A illustrates an example interface associated with the central database system, according to one embodiment.

FIG. 3A illustrates an example interface 300 associated with the central database system 110, according to one embodiment. The user interface 300 is displayed by a device of an account holder entity 130. Along the right-hand side of the user interface 300, four content items (i.e., content item 310, content item 320, content item 330, and content item 340) are displayed to the account holder entity 130. In other embodiments, the content items 310, 320, 330, 340 may be displayed along any side of and/or in different areas or portions of the user interface 300. The content items 310, 320, 330 include text and interface elements (i.e., links 315, 325, 335, respectively), and the content item 340 includes only an interface element (a link). The links 315, 325, 335 and the content item 340 as interface elements provide a means for the account holder entity 130 to interact with the respective content items.

When the account holder entity 130 interacts with (e.g., clicks on) a link, interaction data may be stored in the interaction database 160. In some embodiments, in response to either an interaction or no interaction of the account holder entity 130 with any of the content items 310, 320, 330, 340, the central database system 110 can update the set of training information stored within the training information database 165, and the training engine 175 can retrain the machine-learned model 170 based on the updated set of training information.

Figure 3B:
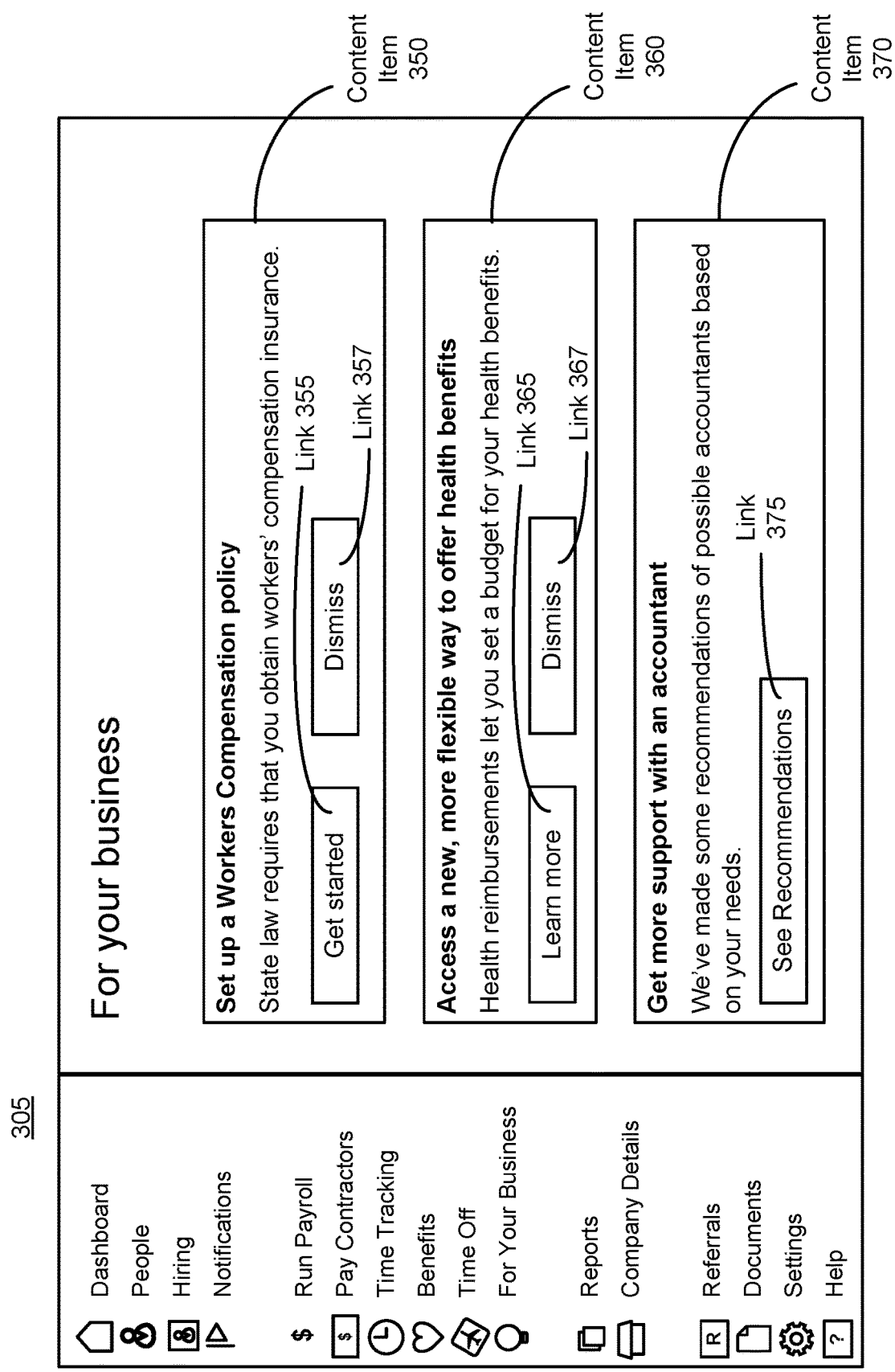
FIG. 3B illustrates another example interface associated with the central database system, according to one embodiment.

FIG. 3B illustrates another example interface 305 associated with the central database system 110, according to one embodiment. The user interface 305 is displayed by a device of an account holder entity 130. The user interface 305 is substantially similar to the user interface 300 in that there are multiple content items including interface elements being displayed by the user interface. The user interface 305 includes three content items (i.e., content item 350, content item 360, and content item 370) being displayed to the account holder entity 130. The content item 350 includes text and interface elements (i.e., link 355 and link 357). The content item 360 includes text and interface elements (i.e., link 365 and link 367). The content item 370 includes text and interface element (i.e., link 375). In one example, the account holder entity 130 may interact with content item 360 by selecting link 365. This interaction may be stored by the central database system 110 in the interaction database 160. In another example, the account holder entity 130 may interact with content item 360 by selecting link 367. This interaction may be stored by the central database system 110 in the interaction database 160. With one interaction being a positive interaction where the account holder entity 130 wanted to 'Learn more' by selecting link 365 and the other interaction being a negative interaction where the account holder entity 130 wanted to 'Dismiss' the content item, the central database system 110 can update the set of training information accordingly. The training engine 175 can retrain the machine-learned model 170 based on the updated set of training information.

Process for Identifying Account Holder Entities

FIG. 4 is a flowchart illustrating a process 400 for training and applying a machine-learned model to identify account holder entities to present with a content item, according to one embodiment. It should be noted that in other embodiments, the process illustrated by FIG. 4 can include fewer, additional, or different steps than those described herein.

A training set of information is accessed 410 describing entity characteristics of each account holder in a first set of account holder entities, content item characteristics of a content item presented to each account holder entity of the first set, and interaction between the first set of account holder entities and the presented content item. Entity characteristics are features describing the account holder entity (e.g., describing the employer) and describing each of the people associated with the account holder entity (e.g., describing each employee). In some embodiments, the entity characteristics are provided by each account holder entity to the central database system during set-up of a central database system account. Content item characteristics are features describing the content item (e.g., industries targeted by the content item, one or more geographic locations targeted by the content item, services described in the content item, products described in the content item, any time sensitive information included in the content item, and so on). In some embodiments, the content characteristics are provided by a content provider when the content provider provides the content item to the central database system.

Interaction data is recorded by the central database system and stored in a database. Interaction data may include who (i.e., which account holder entities) interacted with a content item, what type of interaction took place (e.g., selection of a link, selection of a button, etc.), what was the outcome of the interaction (e.g., positive outcomes such as likes, subscriptions, views, purchases, etc. or negative outcomes such as dislikes, deletions, ignores, etc.), when an interaction with a content item takes place, an amount of time between a content item being displayed to an account holder entity and an interaction with the content item taking place.

Some or all of the account holder entities of the first set may be randomly chosen and presented with the content item by the central database system. For example, a content provider provides a content item, corresponding content item characteristics of the content item, and any other information relevant to the content item to the central database system. The central database system presents this content item to random account holder entities included in the first set (i.e., the central database system is agnostic to some or all of the account holder entities of the first set presented with the content item).

A machine-learned model is trained 420 using the accessed training set of information to identify additional account holder entities that if presented with the content item are most likely to interact with the content item. In some embodiments, the machine-learned model can be trained to identify account holder entities associated with an above-threshold likelihood to result, when presented the content item, in an interaction with the content item. As noted above, the machine-learned model can be a neural network, a Bayes classifier, a linear support vector machine, and the like.

The central database system identifies 430 a target set of account holder entities. In some embodiments, one or more account holder entities of the target set may be identified based on entity characteristics of these account holder entities matching some of the content item characteristics (e.g., when an account holder entity grows to a certain headcount, the account holder entity can be identified so that a content item advertising a law firm may be presented). In some embodiments, one or more account holder entities of the target set may be identified based on information provided by a content provider. For instance, the content provider for a particular content item may dictate certain entity characteristics that have to be present in the one or more account holder entities. In some embodiments, none of the account holder entities in the target set satisfy exclusion criteria. Exclusion criteria being criteria that if satisfied result in an account holder entity to not be included in the target set of account holder entities. In some embodiments, exclusion criteria may include an overlap between an entity characteristic of an account holder entity and a content characteristic of the content item. In one example, an account holder entity that provides accounting services to customers (i.e., an entity characteristic) would not be identified to be presented with a content item that advertises services provided by a different accounting firm (i.e., a content item characteristic). In some embodiments, exclusion criteria may include an opt-out setting set by the account holder entity. In some embodiments, exclusion criteria may include the account holder entity having been presented the content item recently within a predefined time interval (e.g., within 1 hour, within 4 hours, within 1 day, etc.). In some embodiments, the one or more account holder entities of the target set may be chosen at random.

The central database system applies 440 the trained machine-learned model to the entity characteristics of each account holder entity of the target set, the entity characteristics of each account holder entity of the first set that previously interacted with the content item, and the content item characteristics to identify a subset of the target set of account holder entities for presentation of the content item. The trained machine-learned model may identify one or more account holder entities to be included in the subset that are associated with entity characteristics that match a threshold amount (e.g., two matches, three matches, five matches, etc.) and/or a threshold percentage (e.g., 25%, 50%, 75%, etc.) of entity characteristics associated with the first set of account holder entities that previously interacted with the content item. In some embodiments, the machine-learned model 170 is configured to apply a weight to each account holder entity in the first set of account holder entities that previously interacted with that content item. The weight may determine to what effect the entity characteristics of each account holder entity in the first set have on the determination of the subset of the target set of account holder entities. For example, an account holder entity in the first set that previously interacted with the content item may historically interact with substantially all of the content items it is presented with. This account holder entity may be assigned a lower weight such that the entity characteristics of this account holder entity are not considered by or are considered by a lesser degree by the machine-learned model in the selection of the subset. In another example, an account holder entity in the first set that previously interacted with the content item and the interaction was a positive outcome (e.g., the account holder entity selected link to purchase an item advertised by the content item) may be assigned a higher weight such that the entity characteristics of this account holder entity are considered to a higher degree by the machine-learned model.

The central database system causes 450 display of the content item to the subset within an interface displayed by a device. Each device associated with an account holder entity of the subset. The content item includes an interface element that, when selected, causes an interaction to take place.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A central database system comprising:
    a hardware processor; and
    a non-transitory computer-readable storage medium storing executable instructions that, when executed by the hardware processor, cause the hardware processor to perform steps comprising:
        training a machine-learned model using entity characteristics and interactions associated with a content item, the machine-learned model configured to identify additional account holder entities that, if presented with the content item, are most likely to interact with the content item;
        causing display of the content item to a subset of account holder entities identified using the trained machine-learned model within an interface displayed by devices associated with the subset of account holder entities, the content item including an interface element that, when selected or interacted with, enables an account holder entity to interact with the content item;
        receiving one or more interactions from an account holder entity with the displayed content item;
        updating the training set of information to additionally include the received one or more interactions and associated labels indicating for each of the received interactions that the interaction is a positive interaction or a negative interaction; and
        updating the machine-learned model by retraining the machine-learned model using the updated training set of information.

2. The central database system of claim 1, wherein none of the subset of account holder entities satisfy exclusion criteria comprising an overlapping entity characteristic and content item characteristic.

3. The central database system of claim 1, wherein identifying the subset of account holder entities comprises identifying one or more account holder entities based on one or more entity characteristics defined by a content item provider.

4. The central database system of claim 1, wherein the entity characteristics include one or more of: a type of account holder entity, geographic locations in which the account holder entity is present, an industry associated with the account holder entity, a number of individuals associated with the account holder entity, demographic information about individuals associated with the account holder entity, expertise information about individuals associated with the account holder entity, and a number of times the account holder entity interacts with any previously presented content item.

5. The central database system of claim 1, wherein content item characteristics include one or more of: industries targeted by the content item, one or more demographics targeted by the content item, one or more roles targeted by the content item, one or more geographic locations targeted by the content item, services described in the content item, products described in the content item, any time sensitive information included in the content item, and a number of times the content item has been displayed and to whom.

6. The central database system of claim 1, wherein the subset of account holder entities are a random subset of account holder entities selected from a set of account holder entities.

7. The central database system of claim 1, wherein the subset of account holder entities comprise all account holder entities determined by the machine-learned model to be associated with an above-threshold likelihood to, when presented the content item, interact with the content item.

8. A method comprising:
    training a machine-learned model using entity characteristics and interactions associated with a content item, the machine-learned model configured to identify additional account holder entities that, if presented with the content item, are most likely to interact with the content item;
    causing display of the content item to a subset of account holder entities identified using the trained machine-learned model within an interface displayed by devices associated with the subset of account holder entities, the content item including an interface element that, when selected or interacted with, enables an account holder entity to interact with the content item;
    receiving one or more interactions from an account holder entity with the displayed content item;
    updating the training set of information to additionally include the received one or more interactions and associated labels indicating for each of the received interactions that the interaction is a positive interaction or a negative interaction; and
    updating the machine-learned model by retraining the machine-learned model using the updated training set of information.

9. The method of claim 8, wherein none of the subset of account holder entities satisfy exclusion criteria comprising an overlapping entity characteristic and content item characteristic.

10. The method of claim 8, wherein identifying the subset of account holder entities comprises identifying one or more account holder entities based on one or more entity characteristics defined by a content item provider.

11. The method of claim 8, wherein the entity characteristics include one or more of: a type of account holder entity, geographic locations in which the account holder entity is present, an industry associated with the account holder entity, a number of individuals associated with the account holder entity, demographic information about individuals associated with the account holder entity, expertise information about individuals associated with the account holder entity, and a number of times the account holder entity interacts with any previously presented content item.

12. The method of claim 8, wherein content item characteristics include one or more of: industries targeted by the content item, one or more demographics targeted by the content item, one or more roles targeted by the content item, one or more geographic locations targeted by the content item, services described in the content item, products described in the content item, any time sensitive information included in the content item, and a number of times the content item has been displayed and to whom.

13. The method of claim 8, wherein the subset of account holder entities are a random subset of account holder entities selected from a set of account holder entities.

14. The method of claim 8, wherein the subset of account holder entities comprise all account holder entities determined by the machine-learned model to be associated with an above-threshold likelihood to, when presented the content item, interact with the content item.

15. A non-transitory computer-readable storage medium storing executable instructions that, when executed by the hardware processor, cause the hardware processor to perform steps comprising:
training a machine-learned model using entity characteristics and interactions associated with a content item, the machine-learned model configured to identify additional account holder entities that, if presented with the content item, are most likely to interact with the content item;
causing display of the content item to a subset of account holder entities identified using the trained machine-learned model within an interface displayed by devices associated with the subset of account holder entities, the content item including an interface element that, when selected or interacted with, enables an account holder entity to interact with the content item;
receiving one or more interactions from an account holder entity with the displayed content item;
updating the training set of information to additionally include the received one or more interactions and associated labels indicating for each of the received interactions that the interaction is a positive interaction or a negative interaction; and
updating the machine-learned model by retraining the machine-learned model using the updated training set of information.

16. The non-transitory computer-readable storage medium of claim 15, wherein none of the subset of account holder entities satisfy exclusion criteria comprising an overlapping entity characteristic and content item characteristic.

17. The non-transitory computer-readable storage medium of claim 15, wherein identifying the subset of account holder entities comprises identifying one or more account holder entities based on one or more entity characteristics defined by a content item provider.

18. The non-transitory computer-readable storage medium of claim 15, wherein the entity characteristics include one or more of: a type of account holder entity, geographic locations in which the account holder entity is present, an industry associated with the account holder entity, a number of individuals associated with the account holder entity, demographic information about individuals associated with the account holder entity, expertise information about individuals associated with the account holder entity, and a number of times the account holder entity interacts with any previously presented content item.

19. The non-transitory computer-readable storage medium of claim 15, wherein the first set of account holder entities are a random set of account holder entities and wherein identifying the target set of account holder entities comprises identifying account holder entities that share at least a threshold amount of entity characteristics with account holder entities in the first set of account holder entities.

20. The non-transitory computer-readable storage medium of claim 15, wherein the subset of account holder entities are a random subset of account holder entities selected from a set of account holder entities.

* * * * *